(12) United States Patent
Kasriel et al.

(10) Patent No.: US 7,188,214 B1
(45) Date of Patent: Mar. 6, 2007

(54) EFFICIENT COMPRESSION USING DIFFERENTIAL CACHING

(75) Inventors: Stephane Kasriel, Mountain View, CA (US); Walter Mann, San Francisco, CA (US)

(73) Assignee: Digital River, Inc., Eden Prairie, MN (US)

( * ) Notice: Subject to any disclaimer, the term of this patent is extended or adjusted under 35 U.S.C. 154(b) by 251 days.

(21) Appl. No.: 09/923,809

(22) Filed: Aug. 7, 2001

(51) Int. Cl.
*G06F 12/06* (2006.01)

(52) U.S. Cl. ........................ 711/118; 711/100; 709/247; 709/219

(58) Field of Classification Search ................. 709/213, 709/224, 205, 105, 104, 247, 219, 225, 201; 707/10, 1; 711/118, 170, 100
See application file for complete search history.

(56) References Cited

U.S. PATENT DOCUMENTS

| | | | |
|---|---|---|---|
| 5,680,634 A | 10/1997 | Estes | |
| 5,727,129 A | 3/1998 | Barrett et al. | |
| 5,728,129 A | 3/1998 | Sumners | |
| 5,774,660 A | 6/1998 | Brendel et al. | |
| 5,802,292 A | 9/1998 | Mogul | |
| 5,826,258 A | 10/1998 | Gupta et al. | |
| 5,845,088 A | 12/1998 | Lewis | |
| 5,859,971 A | 1/1999 | Bittinger et al. | |
| 5,878,223 A | 3/1999 | Becker et al. | |
| 5,878,429 A | 3/1999 | Morris et al. | |
| 5,931,904 A | 8/1999 | Banga et al. | |
| 5,944,790 A | 8/1999 | Levy | |
| 5,978,841 A | 11/1999 | Berger | |
| 5,983,227 A | 11/1999 | Nazem et al. | |
| 5,987,480 A | 11/1999 | Donohue et al. | |
| 6,003,087 A | 12/1999 | Housel, III et al. | |
| 6,021,426 A | 2/2000 | Douglis et al. | |
| 6,026,413 A | 2/2000 | Challenger et al. | |
| 6,067,565 A | 5/2000 | Horvitz | |
| 6,085,193 A | 7/2000 | Mallkin et al. | |
| 6,098,152 A | 8/2000 | Mounes-Toussi | |
| 6,112,242 A | 8/2000 | Jois et al. | |

(Continued)

FOREIGN PATENT DOCUMENTS

DE 010146356 A1 * 4/2003

(Continued)

OTHER PUBLICATIONS

Marshall Brain, How Stuff Works, "How Web Servers and the Internet Work," obtained at Internet address http://www.howstuffworks.com/web-server.htm.*

(Continued)

*Primary Examiner*—Pierre-Michel Bataille
(74) *Attorney, Agent, or Firm*—North Oaks Patent Agency; Shawn B. Dempster

(57) ABSTRACT

A technique for increased efficiency of content delivery over a network is described. Instances of web pages are divided into (1) templates including those elements of a web page that are relatively unchanging and (2) delta information including those elements that are ephemeral or customized. Each template is compressed and cached at an originating server. Transmission of the delta information is decoupled from transmission of the template. When a user requests a page, the compressed template is sent (either from an originating server or a mirror thereof). The delta information is compressed and sent separately. Since the template is only compressed once and is cached locally, it requires less bandwidth and allocation of other computing resources to transmit than transmission of a compressed web page.

32 Claims, 3 Drawing Sheets

U.S. PATENT DOCUMENTS

| | | | |
|---|---|---|---|
| 6,144,990 A | 11/2000 | Brandt et al. | |
| 6,154,767 A | 11/2000 | Altschuler et al. | |
| 6,216,212 B1 | 4/2001 | Challenger et al. | |
| 6,256,712 B1 | 7/2001 | Challenger et al. | |
| 6,260,192 B1 | 7/2001 | Rosin et al. | |
| 6,314,465 B1 | 11/2001 | Paul et al. | |
| 6,327,628 B1 | 12/2001 | Anuff et al. | |
| 6,343,318 B1* | 1/2002 | Hawkins et al. | 709/219 |
| 6,374,305 B1 | 4/2002 | Gupta et al. | |
| 6,377,978 B1 | 4/2002 | Nguyen | |
| 6,397,217 B1* | 5/2002 | Melbin | 707/10 |
| 6,405,252 B1* | 6/2002 | Gupta et al. | 709/224 |
| 6,453,319 B1 | 9/2002 | Mattis et al. | |
| 6,553,413 B1* | 4/2003 | Leighton et al. | 709/219 |
| 6,606,525 B1* | 8/2003 | Muthuswamy et al. | 709/203 |
| 6,623,529 B1 | 9/2003 | Lakritz | |
| 6,629,138 B1 | 9/2003 | Lambert et al. | |
| 6,704,024 B2 | 3/2004 | Robotham | |
| 6,721,780 B1 | 4/2004 | Kasriel et al. | |
| 6,728,785 B1* | 4/2004 | Jungck | 709/247 |
| 6,760,746 B1 | 7/2004 | Schneider | |
| 6,862,626 B1 | 3/2005 | Ryu | |
| 6,868,453 B1 | 3/2005 | Watanabe | |
| 6,873,877 B1 | 3/2005 | Tobias et al. | |
| 6,912,591 B2 | 6/2005 | Lash | |
| 6,944,817 B1 | 9/2005 | Danneels | |
| 7,058,700 B1 | 6/2006 | Casalaina | |
| 7,092,997 B1 | 8/2006 | Kasriel et al. | |
| 7,096,418 B1 | 8/2006 | Singhal et al. | |
| 2001/0037361 A1 | 11/2001 | Croy | |
| 2001/0037400 A1* | 11/2001 | Raz et al. | 709/232 |
| 2001/0056460 A1 | 12/2001 | Sahota et al. | |
| 2002/0032677 A1* | 3/2002 | Morgenthaler et al. | 707/3 |
| 2002/0048450 A1 | 4/2002 | Zetts | |
| 2002/0056010 A1* | 5/2002 | Lincoln et al. | 709/247 |
| 2002/0138509 A1 | 9/2002 | Burrows et al. | |
| 2002/0138511 A1 | 9/2002 | Psounls et al. | |
| 2002/0161860 A1 | 10/2002 | Godlin et al. | |
| 2003/0009563 A1 | 1/2003 | Douglis et al. | |
| 2003/0110186 A1 | 6/2003 | Markowski et al. | |
| 2003/0110296 A1 | 6/2003 | Kirssch et al. | |
| 2003/0120752 A1 | 6/2003 | Corcoran | |
| 2004/0128346 A1 | 7/2004 | Melamed et al. | |
| 2004/0205165 A1* | 10/2004 | Melamed et al. | 709/219 |
| 2006/0168348 A1 | 7/2006 | Casalaina | |

FOREIGN PATENT DOCUMENTS

| | | | |
|---|---|---|---|
| EP | 001662405 A1 * | 5/2006 | |
| JP | 02003132086 A * | 5/2003 | |
| WO | WO 00/28433 A3 | 5/2000 | |
| WO | WO 200254258 A * | 1/2001 | |

OTHER PUBLICATIONS

"Scalable Web clusters with static and dynamic contents" Casalicchio, E. Colajanni, M., IEEE International Proceedings on Conference Cluster Computing, pp. 170-177, Nov. 2000.*

"Intelligent prefetch in WWW using client behavior characterization" Swaminathan, N. Raghavan, S.V., International Symposium on Modeling, Analysis and Simulation of Computer and Telecommunication Systems, pp. 13-19, Sep. 2000.*

A schema-based approach to Web engineering: Kuhnke, C. Schneeberger, J. Turk, A., System Siences, SCHEMA Electronic Documentation Solutions pp. 10, Jan. 2000.*

"A survey of web caching schemes for the Internet" ACM SIGCOMM Computer Communication Review, pp. 36-46, Oct. 1999.*

"Client-Server Compouting In Mobike Environment", Jin Jing, Abdelsalam Helal and Ahmed Elmagarmid, ACM computing Serveys, vol. 31, No. 2, Jun. 1999.*

Jeffrey Mogul et al. "HTTP Delta Clusters and Templates". Network Working Group, Internet Draft, Aug. 24, 2000.

Alberto Accomazzi. "rproxy", rproxy/libhsync pages. Jan. 8, 2002.

U.S. Appl. No. 09/734,910, filed Dec. 11, 2000, Kasriel et al.

U.S. Appl. No. 09/827,268, filed Apr. 4, 2001, Kasriel et al.

U.S. Appl. No. 09/888,374, filed Jun. 22, 2001, Kasriel et al.

Delphion Intellectual Property Network to search. "Wecome to the new world of IP Information, Delphion". [online] 1997-2001, Delphion, Inc., [retrieved on Jul. 24, 2001] Retrieved from the Internet <URL: http:/www.delphion.com>.

Gould, M., Network Caching Guide: Optimizing Web Content Delivery, Boston, MA, Patricia Seybold Group, Mar. 1999, pp. 1-42.

Delphion Intellectual Property Network to search. "Wecome to the new world of IP Information, Delphion", 1997 2001 Delphion Inc.

"Active Cache: caching dynamic contents on the Web", Pei Cao, Jin Zhang and Kevin Beach, The British Computer Society, The Institution of Electrical Engineers & IOP Publishing Ltd., 1999.

* cited by examiner

EFFICIENT COMPRESSION USING DIFFERENTIAL CACHING

RELATED APPLICATIONS

This application is related to the following copending application:

U.S. patent application Ser. No. 09/888,374, filed Jun. 22, 2001, entitled "Content Delivery Network Using Differential Caching."

This application is hereby incorporated by reference as if fully set forth herein.

BACKGROUND OF THE INVENTION

1. Field of the Invention

This invention relates to reducing the bandwidth and computing resources required to transmit a web page over a network.

2. Related Art

It is desirable to transmit web pages in such a way as to minimize the bandwidth and other computing resources required to transmit the web page from a server device to a client device.

One popular technique for minimizing bandwidth requirements and computing resources is to store the web pages at multiple mirroring servers throughout the network. By "pushing content to the edge of a network" (that is, caching the content and serving it from a mirroring server), it is possible to minimize the distance (that is, geographical distance or as measured by network topology) that information must travel before reaching a destination client device. Although redistribution of the load among multiple mirroring servers improves the quality of service by minimizing distance, it does not necessarily affect the bit rate at which a web page is transmitted.

Another technique for minimizing bandwidth requirements involves compression of the web page. Compression generally involves the use of a computer program such as gzip, glib or some other similar program. Since HTML is very compressible (for example, the use of glib can result in 73.8% compression of HTML), there is a significant minimization in the amount of bandwidth required for transmission of web pages. One drawback to this technique however, is that compressing each web page is a relatively inefficient use of computing resources. Every time a web page is sent to a user, the page must be compressed, regardless whether the page was compressed in the past. For example, every time an organizational home page is sent from a server to a client device, computing resources are devoted to compression of that home page. In a second example, every time a server sends similar pages (such two different instances of an order form from an on-line retailer), those pages must be separately compressed without regard for their similarity.

Accordingly, it would be desirable to provide a technique for serving relatively non-static content for delivery in a content delivery network.

SUMMARY OF THE INVENTION

In a first aspect of the invention, a template for a web page or for a set of web pages is identified and compressed at an originating server. A template can include either (1) an entire web page or (2) those elements in a web page that are relatively unchanging. Examples of templates include:

Entire web pages

Order form pages without the personalized information

Stock update pages without the ticker information

Product specs without the product descriptors

Ticket sale pages, without information about a particular event

Portions of comparable web pages wherein a portion of the web page does not change frequently.

A library of these compressed templates is stored at the originating server and the mirroring servers so as to make it available for subsequent requests. Generally, compression of the template only occurs once. The template does not need to be compressed again, unless changes to the template itself are made (for example, changes to the style of the template). In this respect, the invention is very different from the prior art of HTML compression which requires compression of a web page every time the page is sent. By minimizing the number of times that compression takes place, fewer computational resources need be allocated toward compression operations. In a preferred embodiment, the compressed template is cached and served from a remote mirroring server. In other embodiments, the compressed template is cached and served from the originating server. When a client device requests a web page, the compressed template is sent from either the mirroring server (if the template is present) or from the originating server (if the template is not present at the mirroring server) by way of the mirroring server to the client device.

In a second aspect of the invention, delta information from a set of web pages is identified and compressed at the originating server. Unlike templates which include substantial similarities, delta information refers to a set of differences such as differences between instances of a particular web page. For example, in a web page of a completed order form, the web page may be divided into (1) a template, including the unchanging features of the page (or the entire page if there is no dynamic information in the page); and (2) delta information comprising specific personalized information pertaining to an individual order. In a preferred embodiment, the delta information is compressed at the originating server and sent from the originating server to the client. In a preferred embodiment, delta information is compressed each time is it transmitted. Given that the delta information is usually relatively small, the amount of computational resources devoted to its compression is also relatively small. This selective compression minimizes the bandwidth needed to transmit the page while simultaneously minimizing the computing resources allocated for compression. In other embodiments, the delta information may be compressed once and cached until such time that the compressed delta information is reused. This may be useful when the delta information includes advertising copy that may be repeated again.

DESCRIPTION OF THE PREFERRED EMBODIMENT

In the following description, a preferred embodiment of the invention is described with regard to preferred process steps and data structures. Those skilled in the art would recognize after perusal of this application that embodiments of the invention can be implemented using one or more general purpose processors or special purpose processors or other circuits adapted to particular process steps and data structures described herein, and that implementation of the process steps and data structures described herein would not require undue experimentation or further invention.

Lexicography

Originating Server—as used herein, an "originating server" takes on the role of a server in a client-server relationship and is the original provider of content to a client device or to a mirroring server.

Mirroring server—as used herein, a "mirroring server" includes any device that takes on the role of a server in a client-server relationship and that receives requests from client devices and responds to those requests by sending content that originated (in whole or in part) at an originating server.

Template—as used herein, the term "template" refers to a selected portion of a web page that is relatively unchanging. If there is no difference between different instances of a web page, then the entire page may be a template.

Delta information—as used herein, the term "delta information" refers to a selected portion of a web page varies between instances of the web page.

System Elements

Figure 1:
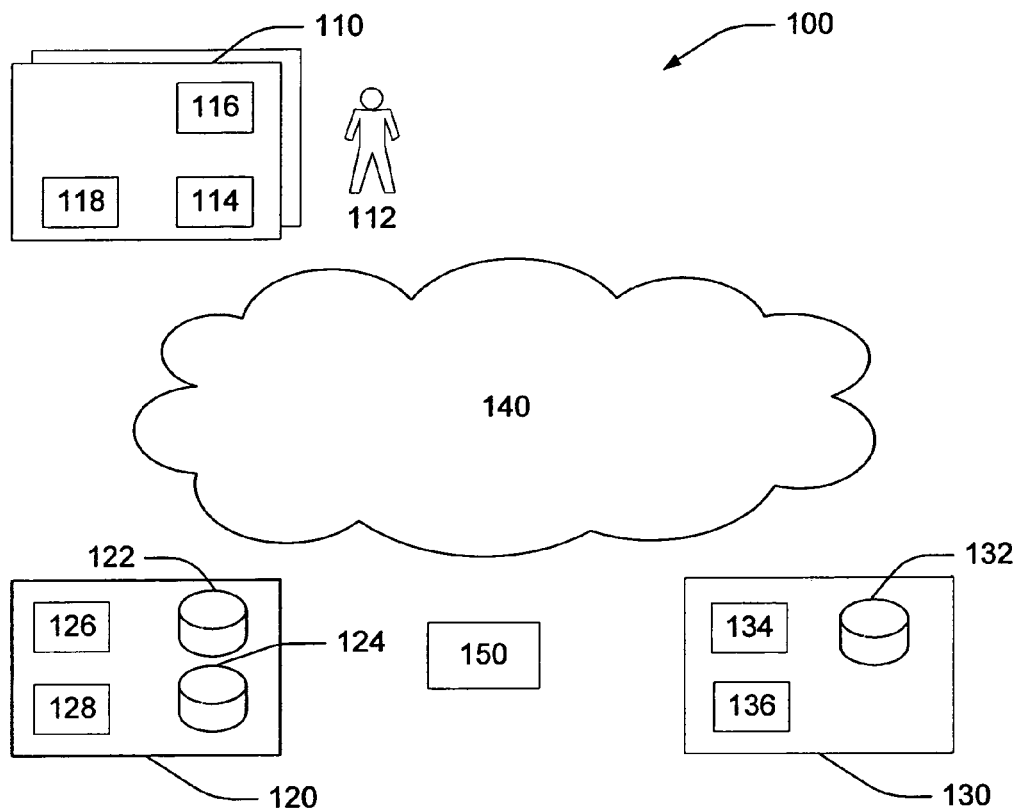
FIG. 1 shows a block diagram of a system for efficient compression using differential caching.

FIG. 1 shows a block diagram of a system for efficient compression using differential caching.

A system for efficient compression using differential caching (shown by general character reference 100) includes one or more client devices 110 under the control of user 112, an originating server 120, a set of mirroring servers 130 and a communication network 140. A proxy encoder server 150 may be positioned "in front" of the originating server 120.

Each client device 110 includes a processor, an input element, a presentation element, a local memory and system software. Client devices 110 further include software 114 disposed for communicating with the communication network 140 and software 116 for integrating a web page.

In a preferred embodiment, each client device 110 includes a general-purpose computer, such as a laptop or workstation. However, a client device 110 can also include (either alone or in conjunction with a laptop or workstation), a hand-held calendar (such as a "Palm Pilot" or other hand-held device), a portable computer, a special purpose computer, a cellular telephone or other telephonic device, a web server acting as the agent for a user, or another device. In alternative embodiments, a client device 110 may also include any other device disposed for performing all or some of the functions described herein.

The software 116 for integrating a web page includes elements for decompressing a template, decompressing delta information, and integrating the template and delta information into a unified presentation for the user 112.

In some embodiments, the client device 110 also includes a decoder 118, preferably as a browser "plug-in". However, the decoder 118 may also be situated in other locations downstream from the originating server 120, such as at a cache or firewall associated with an ISP or at the edge of an enterprise network. The decoder 118 specifies that it accepts delta encoding by adding information to the HTTP header In such embodiments, the decoder 118 may also perform the functions performed by software 114, such as integrating information.

Those embodiments of the invention that do not include a decoder 118 are known as "clientless". In such instances, the server sees that the request does not come from a decoder 118 and serves deltas in the form of javascript instructions and a reference to the template. The scripting capabilities of the client's browser are directed toward applying the delta to the template and displaying the HTML page. In other embodiments, other scripting techniques may also be used.

The originating server 120 is under the control of an entity that provides web pages for users 112. Similar to the client devices 110, the originating server 120 includes a processor, an input element, a presentation element, system software and a local memory. However, unlike the client device 110, the originating server 120 includes a cache of the complete set of compressed web page templates 122, a cache of delta information 124, compression software 126 (for example gzip, glib or another comparable program) and web server software 128. The compression software 126 is used to compress both template information and delta information.

The compressed templates included in the cache of the complete set of compressed web page templates 122 are derived from web pages that include relatively unchanging elements, such as the backdrop in weather pages, blank charts used in stock pages, incomplete order form pages and similar web pages with relatively unchanging elements. If a web page does not include dynamic elements, the compressed template may include the entire web page. In a preferred embodiment, the template is compressed and cached with the complete set of compressed web page templates 122. It does not have to be compressed again unless the information itself is updated (for example, with stylistic changes).

The delta information in the cache of delta information 124 includes those portions of a set of web pages that are highly variable. This delta information can be derived from web pages that include elements that change frequently such as a weather forecast, the value of a stock, information to complete an order form and comparable information that is either very ephemeral or unique to a particular user 112. If the total number of sets of delta information 124 associated with a particular URL is relatively low (for example, a few different rotating banner advertisements) and that information is relatively small, the server can maintain a table mapping uncompressed deltas to compressed deltas. This saves computing resources because there is no need to re-compress the delta information every time it is served. Optimal benefits are obtained if the delta information is requested many times before the template changes.

The set of mirroring servers 130 is usually under the control of the same entity that controls the originating server 120. Similar to the originating server 120, the set of mirroring servers 130 includes a processor, system software, an input element, a presentation element, a local memory, a cache of compressed web page templates 132, compression software 134, and web server software 136. However, unlike the originating server 120, the cache of compressed web page templates 132 at the mirroring server 130 is not necessarily complete. Moreover, compression software 134 at the mirroring server 130 is generally used to compress delta information rather than templates as does the compression software 126. In a preferred embodiment, the mirroring servers are relatively more local to the client devices 110 than the originating server 120.

As noted supra, some embodiments of the system 100 also include a proxy encoder server 150. In these embodiments, the proxy encoder server 150 is coupled to the originating server 120, either as a separate server or as an encoder coupled to the originating server. The proxy encoder server 150 compares information stored locally or at the client to possibly fresher information from the mirroring server 130 or the originating server 120 and serves the compressed template and delta information to the client device 110.

The communication network 140 is disposed for transporting compressed templates, delta information and requests for web pages between the client devices 110, the originating server 120 and the mirroring server 130. In a preferred embodiment, the communication network 140 includes a packet switched network such as the Internet, as well as (in conjunction with or instead of) an intranet, an enterprise network, an extranet, a virtual private network, a virtual switched network, or a wireless network. In alternative embodiments, the communication network 140 may include any other set of communication links that couple the client devices 110 the originating server 120 and the mirroring servers 130.

Method of Operation

Figure 2:
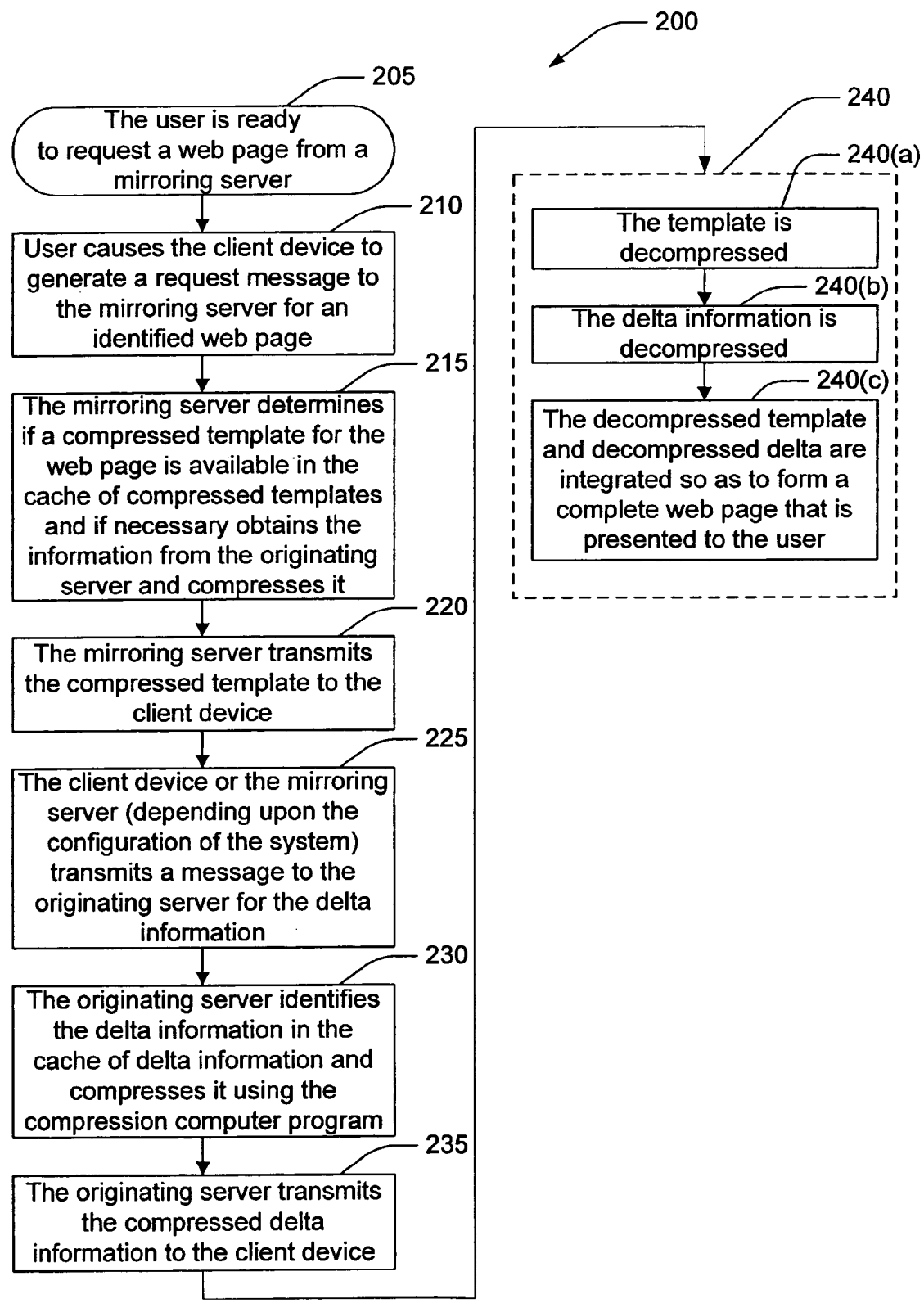
FIG. 2 shows a flow diagram of a method for efficient compression using differential caching.

FIG. 2 shows a flow diagram of a method for efficient compression using differential caching.

A method 200 for efficient compression using differential caching is performed by the system 100, including a set of client devices 110, an originating server 120, a set of mirroring servers 130 and a communication network 140.

Although described serially and in a particular sequence, in a preferred embodiment the steps described herein can be performed concurrently or in parallel by the system elements, or could be performed in a different sequence or some combination thereof.

At a flow point 205, a user 112 is ready to request a web page from a mirroring server 130. In a preferred embodiment, the mirroring server 130 is relatively more proximate to the user 112 than the originating server 120.

At a step 210, the user 112 causes the client device 110 to generate a request message to the mirroring server 130 for an identified web page. In a preferred embodiment, each request for a web page is performed independently, even if a plurality of requests are to be performed substantially simultaneously.

In other embodiments, the client device 110 may request the web page from the originating server 120. Bypassing the mirroring server 130 may save bandwidth if the originating server 120 is closer to the user 112 than the mirroring server 130.

When the request is made, the client device 110 indicates whether it can receive delta information. If the client device 110 can receive delta information, the method proceeds with step 215.

At a step 215, the mirroring server 130 determines if a compressed template for the web page is available in the cache of compressed web page templates 132. If necessary, the mirroring server 130 obtains the compressed template from the originating server 120. If the compressed template is unavailable from the originating server 120 (this may be the case if the template has not been requested before, or if the template has been recently changed), a template is created and compression software 126 at the originating server 120 compresses the template. The newly compressed template is sent from the originating server 120 to the mirroring server 130 where it is stored in the cache of compressed web page templates 132.

At a step 220, the mirroring server 130 transmits the compressed template to the client device 110.

If the mirroring server 130 were bypassed in step 210, the compressed template is sent to the client device 110 from the originating server 120.

At a step 225, the client device 110 or the mirroring server 130 (depending upon the configuration of the system 100) transmits a message to the originating server 120 for the delta information.

At a step 230, the originating server 120 identifies the delta information in the cache of delta information 124 and compresses it using the compression computer program 126. Depending on the size and type of delta information 124, this compressed delta information may be stored at the originating server 120 or the mirroring server 130. This is particularly useful if there is a strong likelihood that the delta information will be requested again.

At a step 235 the originating server 120 transmits the compressed delta information to the client device 110.

At step 240 the client device 110 integrates the template and delta by performing the following substeps:

At a substep 240(*a*), the template is decompressed.

At a substep 240(*b*), the delta information is decompressed.

At a substep 240(*c*), the decompressed template and decompressed delta are integrated so as to form a complete web page that is presented to the user 112.

Given that the software 116 for integrating a web page is present at the client device 110, the resources required to decompress the delta information and template and integrate them do not contribute to the total resources required by the servers to compress and serve the web page.

In other embodiments, the system 100 does not include a decoder 118. These embodiments are known as "clientless", because many of the functions normally performed by the decoder 118 are performed differently. In such embodiments, the originating server 120 identifies that the client can receive a delta (e.g. via a cookie), and serves a delta instead of the document. The delta contains a reference to the template, which can be served from either the mirroring servers 130 or from the originating server 120. In such embodiments, the template is compressed once and cached at the mirroring server 130.

Figure 3:
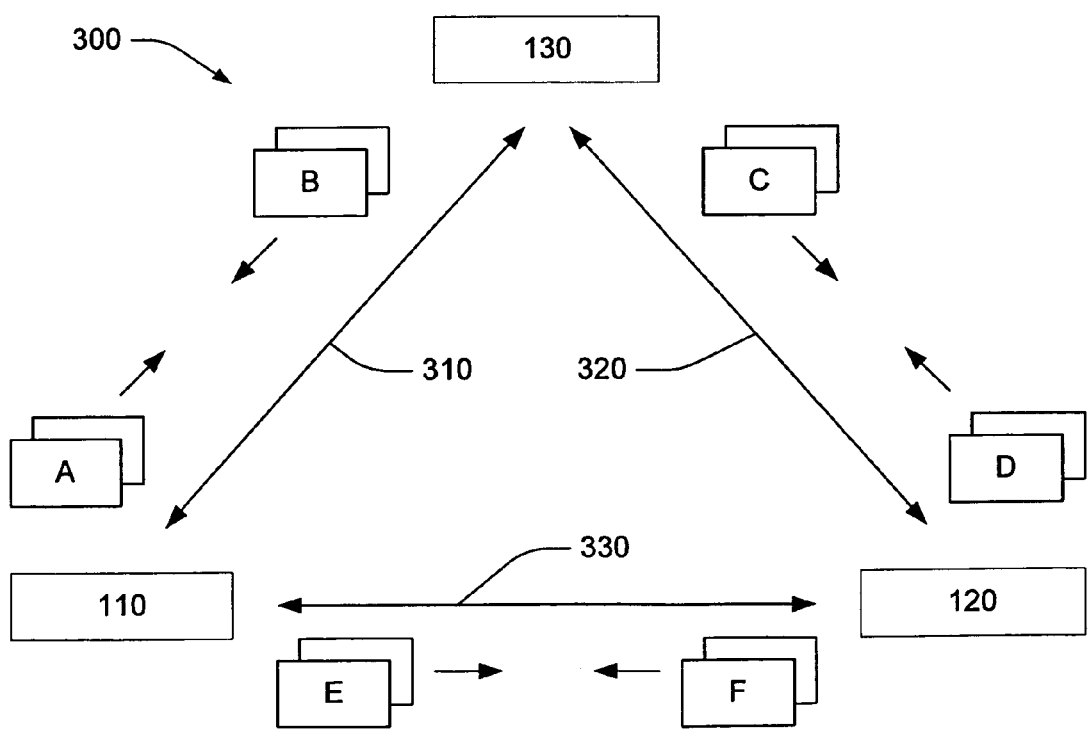
FIG. 3 shows a data flow diagram in a system for efficient compression using differential caching.

FIG. 3 shows a data flow diagram in a system for efficient compression using differential caching.

The system 300 includes a set of data flows for sending and receiving information between the client devices 110, the originating server 120 and the mirroring server 130, using the communication network 140. It should be noted that it is not necessary to exhaust every data flow to achieve efficient differential caching.

A data flow 310 includes messages sets between the client device 110 under the control of the user 112 and the mirroring server 130.

Message set A from the client device 110 to the mirroring server 130 includes requests for web pages.

Message set B from the mirroring server 130 to the client device 110 includes the following:

compressed templates compressed delta information.

A data flow 320 includes messages sets between the mirroring server 130 to the originating server 120.

Message set C from the mirroring server 130 to the originating server 120 includes the following:
  requests for compressed templates that are not available in the cache of compressed web page templates 132
  requests for delta information if the delta information is not available at the mirroring server 130.

Message set D from the originating server 120 to the mirroring server 130 includes the following:
  compressed templates
  compressed delta information.

A data flow 330 includes messages sets between the originating server 120 and the client device 110.

Message set E from the client device 110 to the originating server 120 includes the following:
  requests for compressed templates
  requests for compressed delta information.

Message set F from the originating server 120 to the client device 110 includes the following:
  compressed templates
  compressed delta information.

Figure 4:
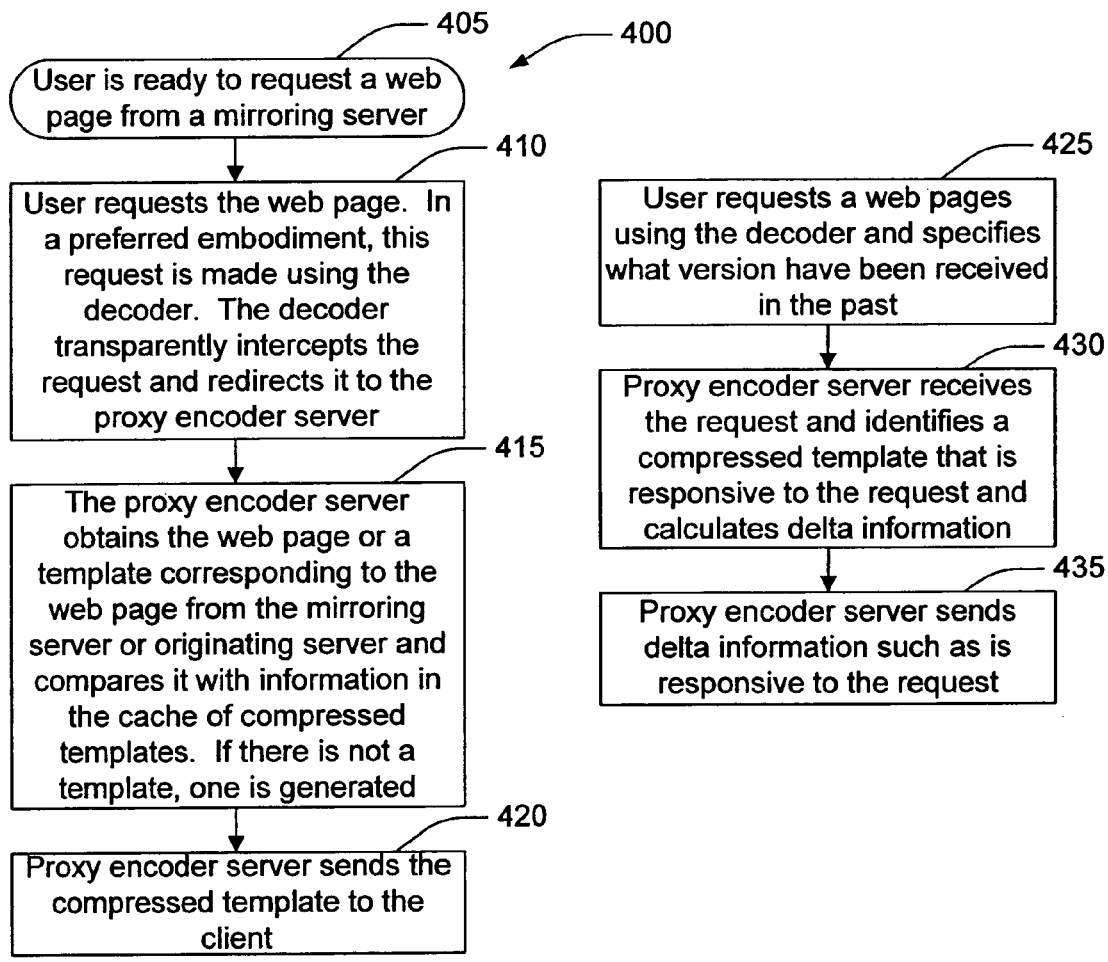
FIG. 4 shows a data flow diagram for efficient compression using differential caching using a proxy encoder server.

FIG. 4 shows a data flow diagram for efficient compression using differential caching using a proxy encoder server.

A method 400 for efficient compression using differential caching is performed by the system 100, including a set of client devices 110, an originating server 120, a set of mirroring servers 130, a proxy encoder server 150 and a communication network 140.

Similar to method 200, the steps described herein can be performed concurrently or in parallel by the system elements, or could be performed in a different sequence or some combination thereof.

At a flow point 405, a user 112 is ready to request a web page from a mirroring server 130. In a preferred embodiment, the mirroring server 130 is relatively more proximate to the user 112 than the originating server 120.

In a step 410, the user 112 requests the web page. In a preferred embodiment, this request is made using the decoder 118. The decoder 118 intercepts the request and redirects it to the proxy encoder server 150. The decoder 118 also informs the proxy encoder server 150 that the client device 110 can receive delta and template information, and provide delta encoding.

In other embodiments, the request can be made without using the decoder 118. In these other embodiments, the request goes directly to the proxy encoder server 150. The absence of a decoder 118 indicates that the client cannot provide delta encoding.

In a step 415, the proxy encoder server 150 obtains the web page or a template corresponding to the web page from the mirroring server or originating server. The proxy encoder server 150 compares the web page or template with information in the cache of compressed web page templates 132 (as noted supra, in such embodiments, these caches are local to the proxy encoder server 150). If there is not a corresponding template in the cache of compressed web page templates 132 (as may be the case if the web page was never requested before), then a new template is generated, compressed and cached. If there is a corresponding template in the cache of compressed web page templates 132 and that corresponding template needs to be updated, then updating is performed at this time and the updated template is compressed and cached. The compressed template may be tagged with information specifying a version number associated with the template.

In those embodiments that do not provide delta encoding, the compressed template may be stored at the client device 110. In such embodiments, the proxy encoder server 150 calculates the difference between the compressed template at the client device 110 and the fresh page and calculates a delta. The delta is an HTML page that includes a reference to a compressed template (preferably a Javascript) and some Javascript instructions. In this embodiment, the Javascript instructions tell the client device 110 how to transform the template into the updated web page.

In a step 420, the proxy encoder server 150 sends the compressed template to the client. This compressed template may be stored at the client device 110.

The following steps occur when the user 112 requests the same web page associated with the compressed and cached template:

In a step 425, the user 112 requests a web page using the decoder 118. In making the request, the decoder 118 also specifies what version of a compressed template for the web page has been received in the past. This request is directed to the proxy encoder server 150.

In a step 430, the proxy encoder server 150 receives the request and identifies a compressed template that is responsive to the request. The proxy encoder server 150 calculates the difference between the version of the compressed template and a presumably fresher version of the web page that is obtained from the originating server 120 or the mirroring server 130. This difference is the delta information.

In step 435, the proxy encoder server 150 sends delta information such as is responsive to the request. In some embodiments, the delta information is compressed before sending. In other embodiments, the delta information is compressed and cached.

In the "clientless" version, the proxy encoder server 150 does not know what version of the template is at the client. The proxy encoder server 150 makes this decision and instructs the client to use a specific version of the template. This is comparable to steps 310–335.

Alternative Embodiments

Although preferred embodiments are disclosed herein, many variations are possible which remain within the concept, scope and spirit of the invention; these variations would be clear to those skilled in the art after perusal of this application. One such variation includes caching (either at the originating server, mirroring server or proxy encoder server) a Huffman tree corresponding to a web page that has been requested in the past. In such alternative embodiments, the delta is calculated by comparing the Huffman tree to newer versions of the tree and computing a delta based upon those parts of the tree that have changed. This technique is preferable for web pages that are requested very frequently (or that change very rarely). In other embodiments, a Huffman tree corresponding to a template is generated and served separate from the delta information.

The invention claimed is:

1. A method for transmitting a web page, comprising steps of:
  receiving a request for a web page from a user, the web page being definable by: (i) a template having static, relatively unchanging elements of the web page and (ii) delta information having dynamic, highly variable elements of the web page;
  determining if a compressed version of the template related to the web page is available in a cache at a first server;
  serving the compressed template from the cache in response to the request; and
  serving the delta information in response to the request.

2. The method of claim 1 wherein the receiving step comprises receiving the request by one of an originating server, a proxy encoder server, and a mirroring server.

3. The method of claim 1 further comprising steps of:
compressing the template into the compressed version of the template; and
caching the compressed version of the template in the cache.

4. The method of claim 1 wherein the compressing step comprises generating a Huffman tree corresponding to the template of the web page.

5. The method of claim 1 further comprising steps of:
ascertaining if the compressed template is cached at another location;
obtaining the compressed template from the other location; and
caching the compressed template in the cache at the first server.

6. The method of claim 1 wherein the serving the delta information step comprises serving a compressed version of the delta information to the user.

7. The method of claim 6 further comprising steps of:
compressing the delta information into a compressed version of the delta information; and
caching the compressed version of the delta information in the cache.

8. The method of claim 6 further comprising steps of:
decompressing the served compressed template and the served compressed version of the delta information; and
integrating the decompressed template and delta information into a complete web page.

9. The method of claim 8 wherein the decompressing and integrating steps are performed by one of (i) a client device having a decoder, and (ii) a browser associated with the user that utilizes scripting capabilities of the browser to operate in a clientless manner.

10. The method of claim 1 further comprising steps of:
decompressing the served compressed template; and
integrating the decompressed template and served delta information into a complete web page.

11. The method of claim 10 wherein the decompressing and integrating steps are performed by one of (i) a client device having a decoder, and (ii) a browser associated with the user that utilizes scripting capabilities of the browser to operate in a clientless manner.

12. A method for transmitting a web page, comprising steps of:
identifying a template and delta information that together define a web page, the template having static, relatively unchanging elements of the web page, the delta information having dynamic, highly variable elements of the web page;
compressing the template into a compressed version of the template;
caching the compressed version of the template in a cache at a first server; and
transmitting the compressed version of the template from the cache at the first server to another location in response to a user request.

13. The method of claim 12 further comprising a step of the serving the delta information in response to a user request.

14. The method of claim 13 further comprising steps of: (i) compressing the delta information into a compressed version of the delta information, and (ii) caching the compressed version of the delta information in the cache, and wherein the serving step comprises serving the compressed version of the delta information from the cache in response to a user request.

15. The method of claim 12 wherein the first server is selected from a group consisting of: an originating server, mirroring server, and proxy encoder server.

16. The method of claim 12 wherein the location is selected from a group consisting of: a client device and a mirroring server.

17. The method of claim 12 wherein the compressing step comprises generating a Huffman tree corresponding to the template of the web page.

18. The method of claim 12 further comprising steps of:
caching the compressed version of the template at a second location; and
serving the compressed version of the template from the second location in response to a user request.

19. A first server apparatus for transmitting a web page where the web page is definable by (i) a template having static, relatively unchanging elements of the web page and (ii) delta information having dynamic, highly variable elements of the web page, the first server comprising:
a first cache having a compressed version of the template; and
web server software operatively configured to serve the compressed version of the template from the first cache in response to a request for the web page.

20. The first server apparatus of claim 19 wherein the first server apparatus is a mirroring server.

21. A system for use on a communication network having the first server apparatus of claim 19 and further having a second server, the second server comprising software programmed to: (i) identify the template and delta information that together define the web page, (ii) compress the template into the compressed version of the template, and (iii) send the compressed version of the template to the first server apparatus.

22. The system of claim 21 wherein the second server is selected from a group consisting of an originating server and a proxy encoder server.

23. The system of claim 21 wherein the second server software is further programmed to: (iv) compress the delta information into a compressed version of the delta information and (v) send the compressed version of the template to the first server apparatus.

24. The system of claim 21 wherein the second server software is further programmed to: (iv) calculate a difference between the web page requested by a user and a compressed version of the template previously served to the user as the delta information and (v) serve the delta information in response to the request.

25. A system for use on a communication network having the first server apparatus and second server of claim 24 and further having a client device associated with a user, the client device comprising software programmed to (i) decompress served compressed version of the template and (ii) integrate the decompressed version of the template and served delta information into a complete web page.

26. A system for use on a communication network having the first server apparatus of claim 19 and further having a client device associated with a user, the client device comprising software programmed to (i) decompress served compressed version of the template, (ii) receive delta information for the web page and (iii) integrate the decompressed version of the template and received delta information into a complete web page.

27. The apparatus of claim 19 wherein the compressed version of the template comprises a Huffman tree corresponding to the template of the web page.

28. A method for receiving a web page where the web page is definable by (i) a template having static, relatively unchanging elements of the web page and (ii) delta information having dynamic, highly variable elements of the web page, the method for receiving comprising steps of:

receiving a compressed version of the template from a cache at a first server in response to a request for a web page from a user;

receiving the delta information in response to the request;

decompressing the received compressed version of the template; and integrating the decompressed template and received delta information into a complete web page.

29. The method of claim 28 wherein the compressed version of the template comprises a Huffman tree corresponding to the template of the web page.

30. The method of claim 28 wherein the receiving the delta information step comprises receiving a compressed version of the delta information in response to the request.

31. The method of claim 30 further comprising a step of decompressing the received compressed version of the delta information, and wherein the integrating step comprises integrating the decompressed template and decompressed delta information into a complete web page.

32. The method of claim 28 wherein the decompressing and integrating steps are performed by one of (i) a client device having a decoder, and (ii) a browser associated with the user that utilizes scripting capabilities of the browser to operate in a clientless manner.

* * * * *